March 10, 1959

A. H. HENNING 2,876,927

PLASTIC TANK LINERS

Filed Aug. 6, 1956

INVENTOR
Alfred H. Henning

BY McCoy, Greene & TeGrotenhuis
ATTORNEYS

March 10, 1959  A. H. HENNING  2,876,927
PLASTIC TANK LINERS
Filed Aug. 6, 1956  2 Sheets—Sheet 2
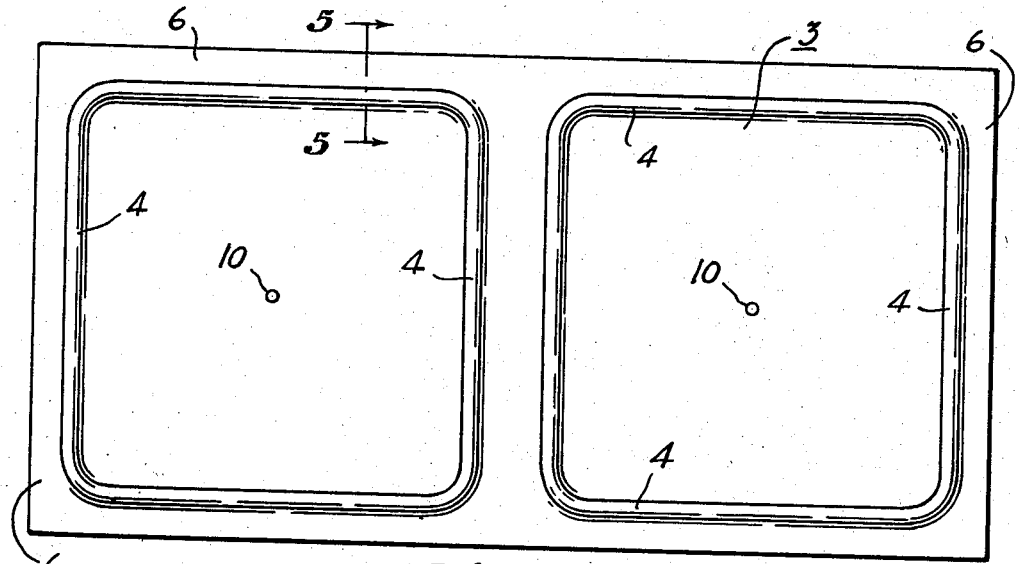
Fig. 4
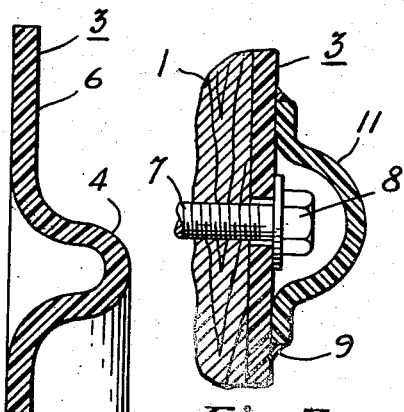
Fig. 5
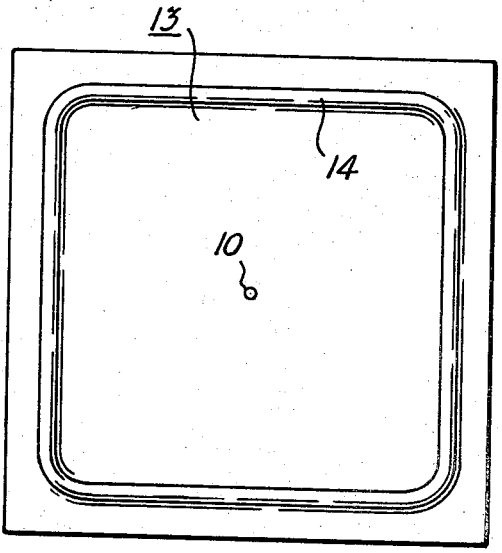
Fig. 6
Fig. 7
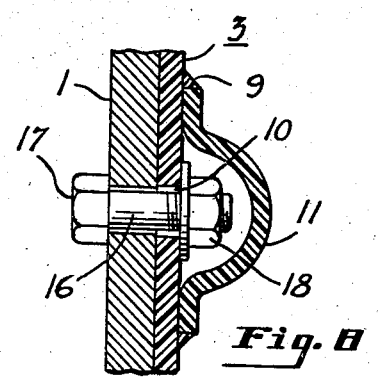
Fig. 8
INVENTOR
Alfred H. Henning
BY McCoy, Greene & TeGrotenhuis
ATTORNEYS

United States Patent Office 2,876,927
Patented Mar. 10, 1959

2,876,927

PLASTIC TANK LINERS

Alfred H. Henning, Andover, Mass., assignor to The General Tire & Rubber Company, Akron, Ohio, a corporation of Ohio Application August 6, 1956, Serial No. 602,224

5 Claims. (Cl. 220—63)

This invention relates to liners for tanks, vats and the like made of a relatively rigid plastic composition which is resistant to corrosion including thermosetting and thermoplastic composition and, more particularly, to such liners made of polyvinyl base compositions.

In the past polyvinyl base compositions such as polyvinyl chloride have been used for corrosion resistant tank liners but a serious obstacle to the use of built up liners of relatively rigid unplasticized polyvinyl chloride has been the large difference between thermal expansion properties of the polyvinyl chloride and the tank material such as steel, concrete or wood.

The present invention provides a corrosion resistant and thermal crack-resistant liner formed by generally polygonal panels made from a relatively rigid polyvinyl base composition and welded together edge to edge so that they conform to and cover the tank walls. The panels are provided with thermal expansion compensating means comprising a hollow raised rib on each panel adjacent each side edge thereof and each extending throughout the major portion of the length of the side edge to which it is adjacent.

The hollow ribs are sufficiently flexible to permit inward and outward movements of the marginal portions of the panels that are outside said ribs with respect to the central portions of the panels around which the ribs extend when the panels are expanded by heat. In order to permit free movement of the marginal portions of the panels under thermal expansion the fastening means attaching the panels to the wall are preferably located inwardly of the hollow ribs.

It is an object of the present invention to provide a corrosion resistant plastic tank liner composed of relatively rigid panels that will not crack or break when subjected to temperature changes.

Other objects, uses and advantages of the present invention will become apparent to those skilled in the art from the following description and claims and from the drawings in which:

Figure 4 is a front elevational view of one of the panels;

Figure 5 is a fragmentary section taken on the line indicated at 5—5 in Fig. 4 and on an enlarged scale;

Figure 6 is a fragmentary sectional view showing the fastening means taken on the line indicated at 6—6 in Fig. 3 and on an enlarged scale;

Figure 7 is an elevational view of a modified form of a panel;

Figure 8 is fragmentary sectional view of a modified form of the fastening means and on an enlarged scale.

Figures 1, 2, 3:
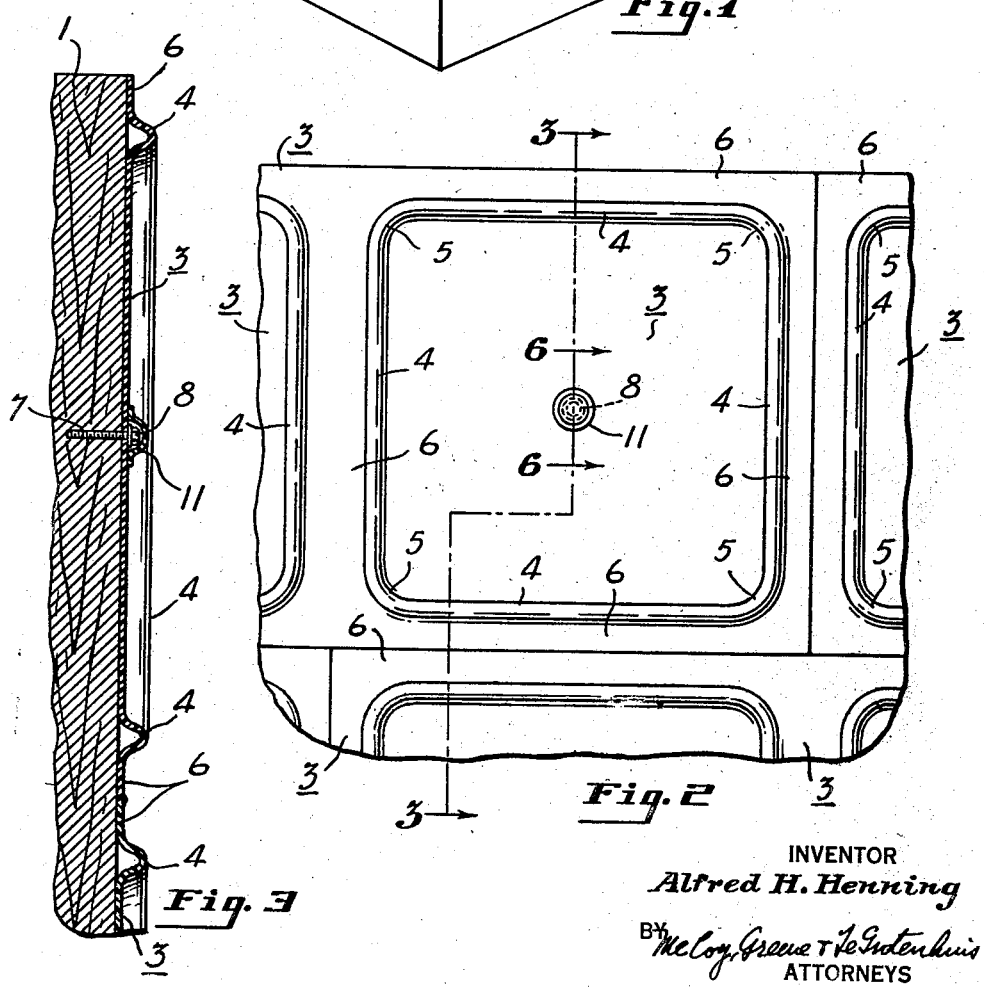
Figure 1 is a fragmentary perspective view of a tank and liner embodying the present invention.
Figure 2 is a fragmentary front elevational view of the plastic line and on an enlarged scale.
Figure 3 is a fragmentary sectional view taken on the broken line indicated at 3—3 in Figure 2.

Referring to the drawings in which like parts are identified with the same reference numerals throughout the several views, Fig. 1 shows a tank having upright walls 1 and a bottom wall 2. A plastic liner is composed of polygonal panels 3 which are joined edge to edge to completely cover the walls. As herein shown, the panels 3 are rectangular in form and each has its marginal edges welded to adjoining panels. The panels are preferably identical in size and shape and arranged in horizontal courses, with the panels of successive courses disposed in staggered relation.

The polyvinyl base composition of the present invention is preferably an unplasticized relatively rigid polymer of vinyl chloride or a copolymer thereof with vinyl acetate or vinylidene chloride. The vinyl polymers or copolymers may be plasticized but the composition should be relatively rigid to obtain the chemical resistance preferred for most applications. If a plasticizer is present it should preferably be of the non migratory or polymeric type.

For example, a rigid shock resistant polyvinyl halide composition may be obtained by plasticizing about 80 to 98 parts by weight of a polyvinyl halide with about 2 to 20 parts by weight of a rubbery copolymer having limited compatibility with the polyvinyl halide such as a copolymer of 83 to 73% by weight of butadiene and 17 to 27% by weight of acrylonitrile. Other suitable polymers are polymers of vinylidene chloride, ethylene and the like in which the polymer contains units according to the general formula

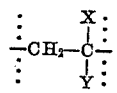

where X and Y are members of the group consisting of hydrogen and halogen.

Still other suitable polyvinyl base compositions are polymers of tetrafluoroethylene, styrene, nuclearly substituted styrenes such as 2,5-dichlorstyrene, methyl methacrylate, methylacrylate and vinyl acetate.

The panels have two substantially parallel raised hollow ribs 4 that are spaced inwardly from their marginal edges and that extend throughout the major portion of the length of each edge. The ribs 4 of each half of the panel 3 are preferably connected by rounded corner portions 5 to provide a continuous rectangular hollow rib spaced inwardly from the edges of the panel. Narrow flat marginal portions 6 are provided between the hollow ribs and marginal edges of the panels. Flat portions 6a preferably wider than the marginal portions 6 are provided between the ribs 4 in the central interior part of the panel 3. The material of the panels even though unplasticized polyvinyl chloride which is very frangible at low temperatures is surprisingly flexible enough to permit the hollow ribs to flex upon expansion of the panels by heat and retraction in the cold without noticeable distortion of the flat portions of the panel.

The amount of thermal expansion of the polyvinyl base material itself is very much greater than the expansion of the tank material such as steel, concrete or wood. For example, the coefficient of thermal expansion of unplasticized polyvinyl chloride is about seven times that of low-carbon steel. Thus the differences in thermal expansion properties tend to produce great stresses in the panel especially when the tank is cool and its liner is heated by introducing a hot liquid into the tank since the steel remains relatively cold when heated liquid is incorporated therein. The flexing of the raised rib provides expansion compensation means to relieve the stresses due to expansion and contraction.

In order to permit free expansion and contraction of the ribs, some or all of the panels are fastened to the wall inwardly of the marginal ribs by a single fastening member or screw 7 having a head 8 and fastened to the wall 1 through an opening 10 in the panel which is larger than the screw 7 so as to permit movement of the panel 3 with respect to the fastening member. A leakproof plastic cover 11 is adhered to the panel 3 over the head of the screw by welding, cementing or by welding and cementing. A weld fillet 9 also of rigid polyvinyl chloride is preferably applied entirely around the cap 11.

The expansion does not increase the surface area of the flat portion of the panel to an extent greater than the increase of the wall dimensions due to heat. Thus, stresses in the flat portion of the panels, which tend to cause cracking or warping of the panels, are eliminated.

In Fig. 7, a modified form of the invention is shown in which a panel 13 has a condensed rectangular form provided with one substantially rectangular raised rib 14.

In Fig. 8, a modified form of the fastening means is shown in which a bolt 16 having a head 17 is fastened to the wall 1 through the opening 10 in the panel which is larger than the bolt 16 so as to permit movement of the panel 3 with respect to the bolt. A nut 18 on the end of the bolt holds the panel 3 against the wall 1.

The rigid, unplasticized polyvinyl chloride compositions are preferred, as stated above, because of their extremely good chemical resistance and relatively higher softening point and heat distortion. While this material is more frangible at room temperature than the composition plasticized with polymeric plasticizers, as above described, the difference in frangibility decreases as the temperature is lowered. At the low temperatures encountered in normal use, the polymerically plasticized polyvinyl chloride has little, if any, advantage.

Furthermore, it is to be understood that in accordance with the provisions of the patent statutes, the particular form of product shown and described and the particular procedure set forth are presented for purposes of explanation and illustration and that various modifications of said product and procedure can be made without departing from our invention.

Having described my invention, I claim:

1. The combination with a tank wall, of a liner therefor comprising polygonal panels that conform to the face of said wall and that are formed of a relatively rigid polyvinyl base composition, said panels being welded together edge to edge and covering said wall, thermal expansion compensating means comprising hollow raised ribs on each panel adjacent the side edges thereof that extend throughout the major portion of the length of each side edge, the ribs of each panel providing grooves facing said wall and said panel having marginal and central portions outwardly and inwardly of said ribs that conform to and closely overlie the face of said wall and means for fastening the central portions of certain of the panels to said wall, said marginal wall portions of said panels being free from attachement to said wall.

2. The combination with a tank wall, of a liner therefor comprising polygonal panels that conform to the face of said wall and that are formed of a relatively rigid polyvinyl base composition, said panels being welded together edge to edge and covering said wall, thermal expansion compensating means comprising hollow raised ribs on each panel adjacent the side edges thereof that extend throughout the major portion of the length of each side edge, the ribs of each panel providing grooves facing said wall and said panel having marginal and central portions outwardly and inwardly of said ribs that conform to and closely overlie the face of said wall and means for fastening the central portions of certain of the panels to said wall, said liner being secured to said wall solely by said fastening means, each fastening means comprising a fastening member extending through a panel into said wall and having a head engaging the outer face of the panel and a cover for each of said heads formed of a composition similar to that of the panel and adhered to the panel around the head.

3. A structure such as set forth in claim 2 in which the panels have holes receiving the fastening members that are of a size to permit movements of the panels with respect to said fastening members.

4. The combination with a tank wall, of a liner therefor comprising rectangular panels that conform to the face of said wall and that are formed of a relatively rigid polyvinyl base composition, said panels being welded edge to edge and covering said wall, thermal expansion means comprising a raised hollow rib of rectangular outline on each panel, said rib having sides spaced inwardly a short distance from side edges of the panel and having rounded corners, the ribs of each panel providing grooves facing said wall and said panel having marginal and central portions outwardly and inwardly of said ribs that conform to and closely overlie the face of said wall and means for fastening the central portions of certain of the panels to said wall, said liner being attached to said wall solely by said fastening means.

5. A structure as set forth in claim 4 in which each fastening means comprises a fastening member extending through a hole in said panel into the wall and having a head portion which engages the outer face of the panel, and a cover for said head formed of a composition similar to that of the panel.

References Cited in the file of this patent

UNITED STATES PATENTS

| | | |
|---|---|---|
| 406,927 | Merriman | July 16, 1889 |
| 1,147,378 | Cronkhite | July 20, 1915 |
| 2,260,393 | McCarthy | Oct. 28, 1941 |
| 2,503,339 | Jandus | Apr. 11, 1950 |
| 2,721,674 | Lazard | Oct. 25, 1955 |